(12) United States Patent
Yoshino et al.

(10) Patent No.: US 7,268,452 B2
(45) Date of Patent: Sep. 11, 2007

(54) SPINDLE MOTOR

(75) Inventors: Nobuhiro Yoshino, Matsuyama (JP); Takeyoshi Yamamoto, Niihama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 258 days.

(21) Appl. No.: 11/038,461

(22) Filed: Jan. 21, 2005

(65) Prior Publication Data

US 2005/0206255 A1 Sep. 22, 2005

(30) Foreign Application Priority Data

Jan. 21, 2004 (JP) .............................. 2004-012513

(51) Int. Cl.
*H02K 11/00* (2006.01)
(52) U.S. Cl. ....................................................... 310/71
(58) Field of Classification Search ................ 310/71, 310/260
See application file for complete search history.

(56) References Cited

U.S. PATENT DOCUMENTS 5,635,781 A * 6/1997 Moritan ........................ 310/71
6,100,612 A * 8/2000 Satoh ......................... 310/49 R
6,566,776 B2 * 5/2003 Hoffmann et al. ............. 310/91
6,753,636 B2 * 6/2004 Rehm et al. ................. 310/258

FOREIGN PATENT DOCUMENTS

JP 6-38057 5/1994

* cited by examiner

*Primary Examiner*—Dang Le
(74) *Attorney, Agent, or Firm*—Steptoe & Johnson LLP

(57) ABSTRACT

A spindle motor is provided in which an end portion of a winding of a coil maintains insulation from a base and the end portion of the winding of the coil can be easily threaded through a hole of a printed circuit board when the end portion of the winding of the coil is drawn out. For this, the spindle motor includes a base fixed with a stator having a coil, an insulating sheet provided between the stator and the base, and a printed circuit board provided in the base on an outer side of the motor. Holes are formed in the base, insulating sheet and printed circuit board so as to communicate with each other, and an winding end portion of the coil is led out to the outside of the motor. The diameter C of the hole 19 in the printed circuit board and the diameter B of the hole 18 of the insulating sheet are smaller than the diameter A of the hole 17 of the base, and the diameter C of the hole 19 is larger than the diameter B of the hole 18.

12 Claims, 5 Drawing Sheets

SPINDLE MOTOR

FIELD OF THE INVENTION

The present invention relates to a spindle motor which is to be built in a hard disk drive and the like.

BACKGROUND OF THE INVENTION

Conventionally, in a spindle motor of this type, to accomplish thin-shaped design, as shown in FIG. 5, for example, a drive magnet 32 is firmly fixed to the interior of a hub 31 holding a disk, a stator 34 which has a coil 33 and is disposed opposite to the hub 31 is fixed to a base 35, an insulating sheet 36 is provided between the stator 34 and the base 35, and a flexible printed circuit (FPC) board 37 is provided in the base 35 on an outer side of the motor. As shown in FIG. 6A, holes 35a, 36a, 37a which communicate with each other are formed, respectively, in the above-described base 35, insulating sheet 36 and flexible printed circuit board 37. An end portion 33a of a winding of the above-described coil 33 is led out to the outer side of the above-described motor through these holes 35a, 36a, 37a, and is connected by a solder 39 to a land formed on the flexible printed circuit board 37. Incidentally, the diameter d of the hole 36a formed in the insulating sheet 36 and the diameter d of the hole 37a formed on the flexible printed circuit board 37 are equal to each other and smaller than the diameter D of the hole 35a formed in the base 35.

According to this conventional type, the end portion 33a of the winding of the coil 33 inserted through each of the above-described holes 35a, 36a, 37a is position-controlled by the hole 36a of the insulating sheet 36 and the hole 37a of the flexible printed circuit board 37 and hence does not come into contact with the inner circumferential surface of the hole 35a of the base 35, with the result that the insulation from the base 35 is maintained (refer to JP2551167Z).

However, in the above-described conventional type, both the diameter d of the hole 36a of the insulating sheet 36 and the diameter d of the hole 37a of the flexible printed circuit board 37 are small. Therefore, it is difficult to draw out the end portion 33a of the winding of the coil 33 and particularly it is very difficult to thread this end portion 33a through the hole 37a of the flexible printed circuit board 37, which is a back side hole. Therefore, this posed the problem that, as shown in FIG. 6B, the end portion 33a of the winding of the coil 33 becomes tangled in the interior of the hole 35a of the base 35.

DISCLOSURE OF THE INVENTION

The present invention has as its object the provision of a spindle motor in which an end portion of a winding of a coil maintains insulation from a base and which enables the end portion of the winding of the coil to be easily threaded through a hole of a printed circuit board when the end portion of the winding of the coil is drawn out.

To achieve the above object, in the first aspect of the present invention, there is provided a spindle motor which comprises a body of rotation to which a drive magnet is fixed, a stator which is disposed opposite to the body of rotation and has a coil, a base to which the stator is fixed, an insulating sheet which is provided at least partly between the stator and the base, and a printed circuit board provided in the base on an outer side of the motor, the respective base, insulating sheet and printed circuit board having holes being formed to communicate with each other, the coil having a winding end portion passing through these holes to be led out to the outer side of the motor. In this spindle motor, the diameter of the hole of the printed circuit board and the diameter of the hole of the insulating sheet are respectively smaller than the diameter of the hole of the base, and the diameter of the hole of the printed circuit board is larger than the diameter of the hole of the insulating sheet.

According to this aspect, because both the diameter of the hole of the printed circuit board and the diameter of the hole of the insulating sheet are smaller than the diameter of the hole of the base, the end portion of the winding of the coil threaded through each of the holes is position-controlled by the hole of the insulating sheet and the hole of the flexible printed circuit board and hence does not come into contact with the inner circumferential surface of the hole of the base, with the result that the insulation from the base 35 is maintained.

Also, because the diameter of the hole of the printed circuit board is larger than the diameter of the hole of the insulating sheet, it is easy to thread the end portion of the winding of the coil through the hole of the printed circuit board 37, which is a back side hole when the end portion of the winding of the coil is drawn out. As a result of this, it is possible to prevent the problem that the end portion of the winding of the coil becomes tangled in the interior of the hole of the base.

In the second aspect of the present invention, if the diameter of the hole of the base is denoted by A and the thickness of the part of the hole of the base is denoted by T, a relation given by $A/T \geq 0.2$ holds.

According to this aspect, the end portion of the winding of the coil can be easily treaded through the hole of the base.

In the third aspect of the present invention, the diameter of the hole of the base is not more than 5 mm. According to this aspect, sealing with an adhesive can be easily and satisfactorily performed.

In the fourth aspect of the present invention, there is provided a spindle motor which comprises a body of rotation to which a drive magnet is fixed, a stator which is disposed opposite to the body of rotation and has a coil, a base to which the stator is fixed, an insulating sheet which is provided at least partly between the stator and the base, and a printed circuit board provided in the base on an outer side of the motor, the respective base, insulating sheet and printed circuit board having holes being formed to communicate with each other, the coil having a winding end portion passing through these holes to be led out to the outer side of the motor. In this spindle motor, if the diameter of the hole formed on the base on the insulating sheet side is denoted by A1, the diameter of the hole formed on the base on the printed circuit board side is denoted by A2, the diameter of the hole formed in the insulating sheet is denoted by B and the diameter of the hole formed in the printed circuit board is denoted by C, a relation given by $B < A1 < C < A2$ holds.

According to this aspect, because the diameter B of the hole of the insulating sheet is smaller than the diameter A1 of the hole of the base on the insulating sheet side and the diameter C of the hole of the printed circuit board is smaller than the diameter A2 of the hole of the base on the printed circuit board side, the end portion of the winding of the coil threaded through each of the holes is position-controlled by the hole of the insulating sheet and the hole of the flexible printed circuit board and hence does not come into contact with the internal circumferential surface of the hole of the base, with the result that insulation from the base is maintained.

Also, the diameter C of the hole of the printed circuit board is larger than the diameter B of the hole of the insulating sheet and also larger than the diameter A1 of the hole of the base on the insulating sheet side, the end portion of the winding of the coil can be easily threaded through the hole of the printed circuit board, which is a back side hole, when the end portion of the winding of the coil is drawn out.

In the fifth aspect of the present invention, if the thickness of the part of the hole of the base is denoted by T, a relation given by $A2/T \geq 0.2$ holds.

According to this aspect, the end portion of the winding of the coil can be easily threaded through the hole of the base.

In the sixth aspect of the present invention, the diameter A1 of the hole of the base on the insulating sheet side is not more than 5 mm.

According to this aspect, sealing with an adhesive can be easily and satisfactorily performed.

In the seventh aspect of the present invention, if the thickness of the part of the hole of the base is denoted by T, a relation given by $0.1 \text{ mm} \leq T \leq 5 \text{ mm}$ holds.

According to this aspect, the hole can be easily formed in the base with a tip of a drill.

According to the present invention, the end portion of the winding of the coil can be easily threaded through the hole of the printed circuit board, which is a back side hole, when end portion of the winding of the coil is drawn out. Therefore, it is possible to prevent the problem that the end portion of the winding of the coil becomes tangled in the interior of the hole of the base and, at the same time, the work of drawing out the end portion of the winding of the coil can be performed in a short time and with good efficiency.

DESCRIPTION OF THE EMBODIMENTS

Figure 1:
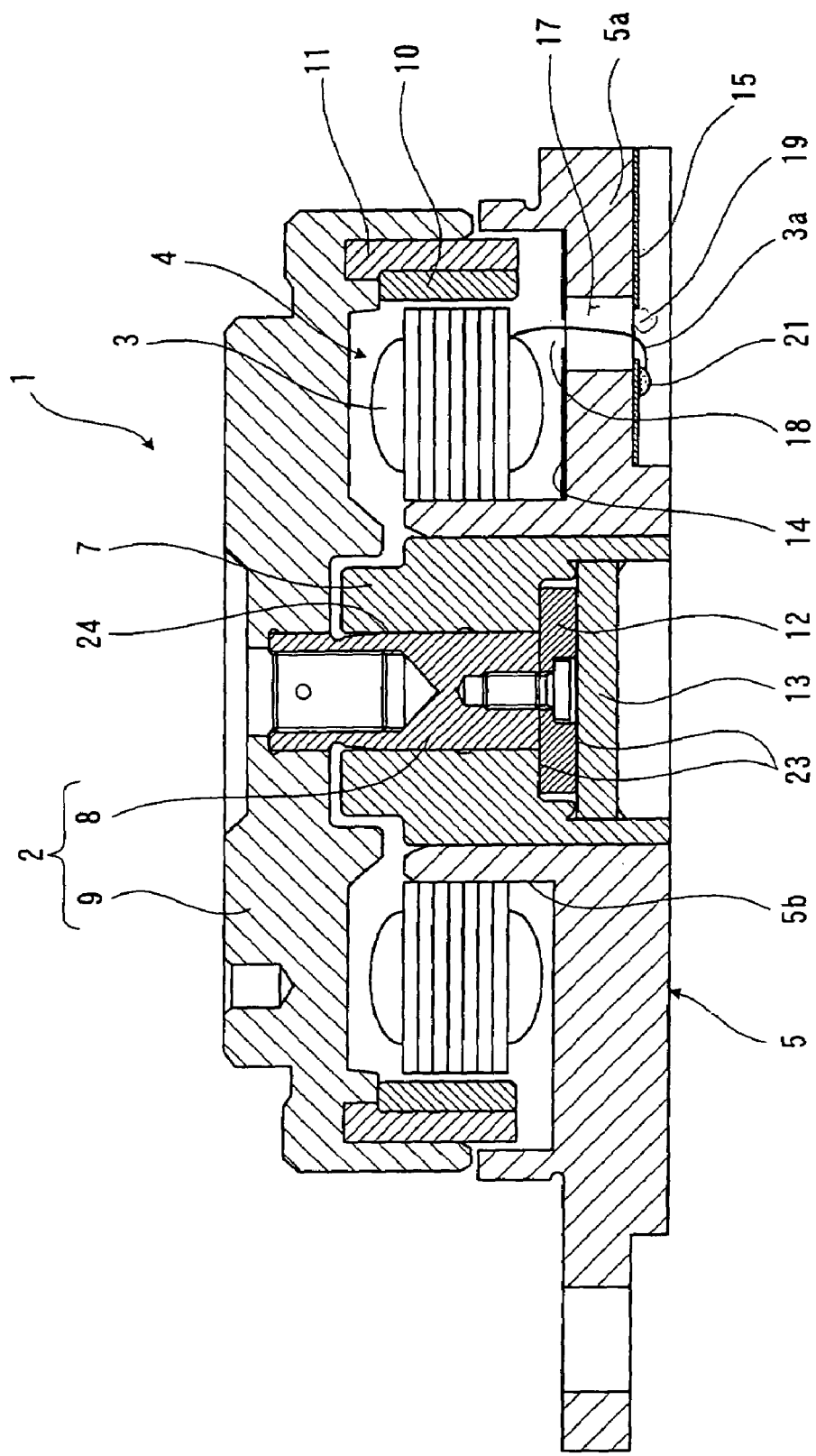
FIG. 1 is a sectional view of a spindle motor according to a first embodiment of the present invention.

The first embodiment of the present invention will be described below on the basis of FIGS. 1 and 2. The reference numeral 1 denotes a spindle motor to be built in a hard disk drive and the like. The spindle motor 1 has a body of rotation 2, a stator 4 which is opposed to this body of rotation 2 and has a coil 3, and a base to which this stator 4 is fixed. The body of rotation 2 is constituted by a shaft 8 which is rotatably inserted into a cylindrical sleeve 7 and a hub 9 attached to a leading end of the shaft 8. A magnetic disk (not shown) is fixed to the outer circumferential part of the hub 9, and an annular drive magnet 10 is attached to the inner circumferential part of the hub 9 via a yoke 11.

A thrust flange 12 is screwed to the base end of the above-described shaft 8 and a thrust plate 13 opposed to the circular flat part of the thrust flange 12 is fixed to the sleeve 7. A thrust bearing 23 and a radial bearing 24 are formed by pouring lubricating oil into a gap opposed to the thrust flange 12 and the sleeve 7, between the thrust flange 12 and the thrust plate 13, and between the circumferential surface of the shaft 8 and the inner circumferential surface of the sleeve 7.

The above-described base 5 is constituted by a disk-shaped part 5a and a cylindrical part 5b which is provided in a standing manner in the center part of this disk-shaped part 5a. The above-described sleeve 7 is inserted into the cylindrical part 5b and fixed. The above-described stator 4 is provided in the outer circumferential part of the cylindrical part 5b.

An insulating sheet 14 is provided between the stator 4 and the disk-shaped part 5a of the base 5. In addition, the insulating sheet 14 is applied to the disk-shaped part 5a. Incidentally, a flexible printed circuit (FPC) board 15 is provided in the disk-shaped part 5a on an outer side of the motor. A straight hole 17 which pierces vertically is provided in the disk-shaped part 5a, and holes 18, 19 are formed respectively in the insulating sheet 14 and the flexible printed circuit board 15 in positions coinciding with the above-described hole 17. These holes 17, 18, 19 communicate with each other.

Multiple end portions 3a of the winding of the coil 3 are bundled up, led out to the outer side of the motor through the holes 17, 18, 19 and connected to a land of the flexible printed circuit board 15 with a solder 21.

If the diameter of the hole 17 of the disk-shaped part 5a of the base 5 is denoted by A, the diameter of the hole 18 of the insulating sheet 14 is denoted by B, the diameter of the hole 19 of the flexible printed circuit board 15 is denoted by C and the thickness of the disk-shaped part 5a (which is equal to the length of the hole 17) is denoted by T, then these dimensions are set at relations given by:

$B < C < A$ $A/T \geq 0.2$ and $A \leq 5$ mm.

Actions in the above constituent features will be described below.

The body of rotation 2 rotates when the coil 3 is energized.

Figure 2:
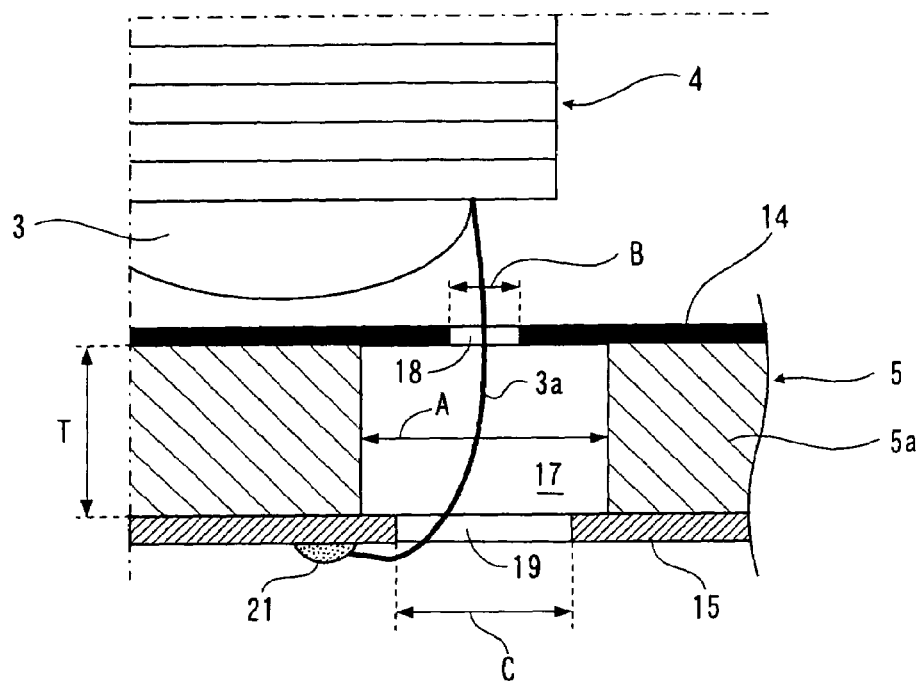
FIG. 2 is an enlarged view of a part of a hole formed in a base, an insulating sheet and a flexible printed circuit board of the spindle motor shown in FIG. 1.

As shown in FIG. 2, because both the diameter B of the hole 18 of the insulating sheet 14 and the diameter C of the hole 19 of the flexible printed circuit board 15 are smaller than the diameter A of the hole 17 of the disk-shaped part 5a of the base 5, the end portion 3a of the winding of the coil threaded through each of the holes 17, 18, 19 is position-controlled by the hole 18 of the insulating sheet 14 and the hole 19 of the flexible printed circuit board 15 and hence does not come into contact with the internal circumferential surface of the hole 17 of the disk-shaped part 5a, with the result that insulation from the base 5 is maintained.

Also, because the diameter C of the hole 19 of the flexible printed circuit board 15 is larger than the diameter B of the hole 18 of the insulating sheet 14, the end portion 3a of the winding can be easily threaded through the hole 19 of the flexible printed circuit board 15, which is a back side hole, when the end portion of the winding is drawn out. As a result of this, it is possible to prevent the problem that the end portion 3a of the winding becomes tangled in the interior of the hole 17 of the disk-shaped part 5a.

Incidentally, the end portion 3a of the winding can be easily threaded through the hole 17 of the disk-shaped part 5a by maintaining the relation given A/T≧0.2. This is described more specifically below. Even when the diameter A of the hole 17 is set at not less than a prescribed value, it becomes difficult to thread the end portion 3a of the winding if the thickness T of the disk-shaped part 5a is increased as a result, with the result that it frequently occurs that the end portion 3a of the winding becomes tangled in the interior of the hole 17. However, it becomes possible to easily thread the end portion 3a of the winding through the hole 17 of the disk-shaped part 5a by setting the ratio of the diameter A of the hole 17 to the thickness T of the disk-shaped part 5A at not less than a prescribed value as described above.

The end portion 3a of the winding is led out to the outer side of the motor through the holes 17, 18, 19 and connected to a land of the flexible printed circuit board 15 with the solder 21, and after that, the end portion 3a of the winding is sealed by pouring an adhesive into the hole 17 of the disk-shaped part 5a. On this occasion, by maintaining the relation given by A≦5 mm as described above, the above-described sealing with an adhesive can be satisfactorily performed and it is possible to positively prevent dust and the like from entering the hard disk from outside. That is, if the situation A>5 mm occurs, the hole 17 is not positively sealed and voids may occur partly, whereas it becomes possible to positively seal the hole 17 by ensuring A≦5 mm as described above. It is preferred that in this manner, the diameter A of the hole 17 of the disk-shaped part 5a of the base 5 be determined in the range (0.2×T≦A≦5) that satisfies both the relation given by A/T≧0.2 and the relation given by A≦5 mm.

Figure 3:
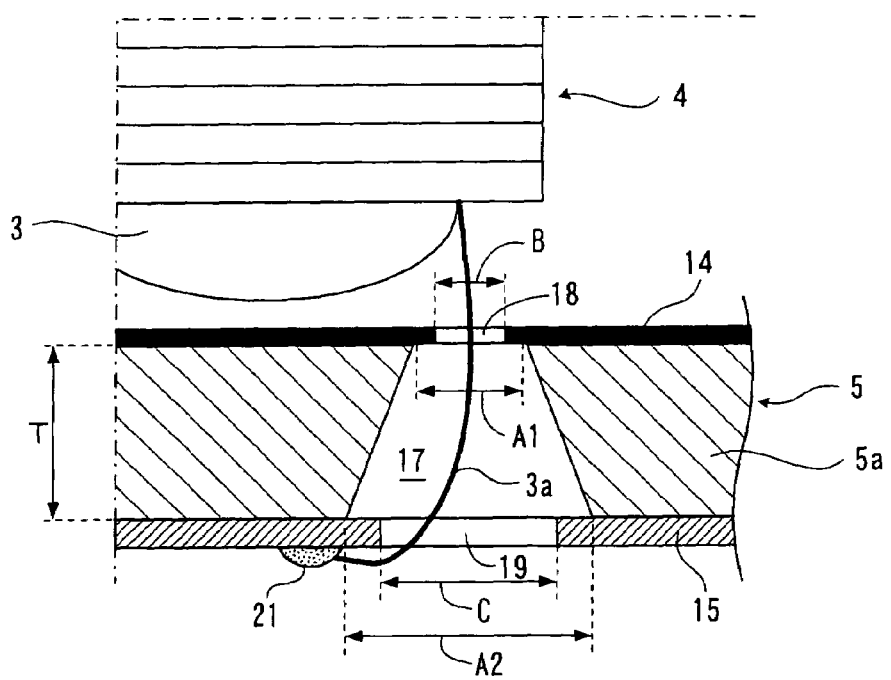
FIG. 3 is an enlarged view of a part of a hole formed in a base, an insulating sheet and a flexible printed circuit board of a spindle motor according to a second embodiment of the present invention.

Next, the second embodiment of the present invention will be described on the basis of FIG. 3.

The hole 17 of the disk-shaped part 5a of the base 5 is formed in such a conical shape that the diameter increases gradually from the insulating sheet 14 side to the flexible printed circuit board 15 side.

If the diameter of the hole 17 of the disk-shaped part 5a of the base 5 on the insulating sheet 14 side is denoted by A1, the diameter of the hole 17 on the flexible printed circuit board 15 side is denoted by A2, the diameter of the hole 18 of the insulating sheet 14 is denoted by B, the diameter of the hole 19 of the flexible printed circuit board 15 is denoted by C and the thickness of the disk-shaped part 5a (which is equal to the length of the hole 17) is denoted by T, then these dimensions are set at relations given by:

B<A1<C<A2

$A2/T \geq 0.2$

A1≦5 mm and 0.1 mm≦T≦5 mm.

Actions in the above constituent features will be described below.

Because the diameter B of the hole 18 of the insulating sheet 14 is smaller than the diameter A1 of the hole 17 of the base 5 on the insulating sheet 14 side and the diameter C of the hole 19 of the printed circuit board 15 is smaller than the diameter A2 of the hole 17 of the base 5 on the flexible printed circuit board 15 side, the end portion 3a of the winding threaded through each of the holes 17, 18, 19 is position-controlled by the hole 18 of the insulating sheet 14 and the hole 19 of the flexible printed circuit board 15 and hence does not come into contact with the internal circumferential surface of the hole 17 of the base 5, with the result that insulation from the base 5 is maintained.

Also, because the diameter C of the hole 19 of the flexible printed circuit board 15 is larger than the diameter B of the hole 18 of the insulating sheet 14 and also larger than the diameter A1 of the hole 17 of the base 5 on the insulating sheet 14 side, the end portion 3a of the winding can be easily threaded through the hole 19 of the flexible printed circuit board 15, which is a back side hole, when the end portion of the winding of the coil is drawn out. As a result of this, it is possible to prevent the problem that the end portion 3a of the winding becomes tangled in the interior of the hole 17 of the disk-shaped part 5a.

Incidentally, the end portion 3a of the winding can be easily threaded through the hole 17 of the disk-shaped part 5a by maintaining the relation given A2/T≧0.2. This is described more specifically below. Even when the diameter A2 of the hole 17 is set at not less than a prescribed value, it becomes difficult to thread the end portion 3a of the winding if the thickness T of the disk-shaped part 5a is increased as a result, with the result that it frequently occurs that the end portion 3a of the winding becomes tangled in the interior of the hole 17. However, it becomes possible to easily thread the end portion 3a of the winding through the hole 17 of the disk-shaped part 5a by setting the ratio of the diameter A2 of the hole 17 to the thickness T of the disk-shaped part 5A at not less than a prescribed value as described above.

The end portion 3a of the winding is led out to the outer side of the motor through the holes 17, 18, 19 and connected to a land of the flexible printed circuit board 15 with the solder 21, and after that, the end portion 3a of the winding is sealed by pouring an adhesive into the hole 17 of the disk-shaped part 5a. On this occasion, by maintaining the relation given by A≦5 mm as described above, the above-described sealing with an adhesive can be satisfactorily performed and it is possible to positively prevent dust and the like from entering the hard disk from outside. That is, if the situation A1>5 mm occurs, the hole 17 is not positively sealed and voids may occur partly, whereas it becomes possible to positively seal the hole 17 by ensuring A1≦5 mm as described above.

Incidentally, by forming the hole 17 of the base 5 in a conical shape, it is possible to reduce the amount of an adhesive required by the above-described sealing compared to a case where the hole 17 is formed in a straight shape as in the first embodiment (see FIG. 2).

Furthermore, when the hole 17 is formed as the disk-shaped part 5a of the base 5 by use of a drill, it is possible to easily form the hole 17 with the tip of the drill by setting the thickness T of the disk-shaped part 5a so as to satisfy the relation 0.1 mm≦T≦5 mm.

Figure 4:
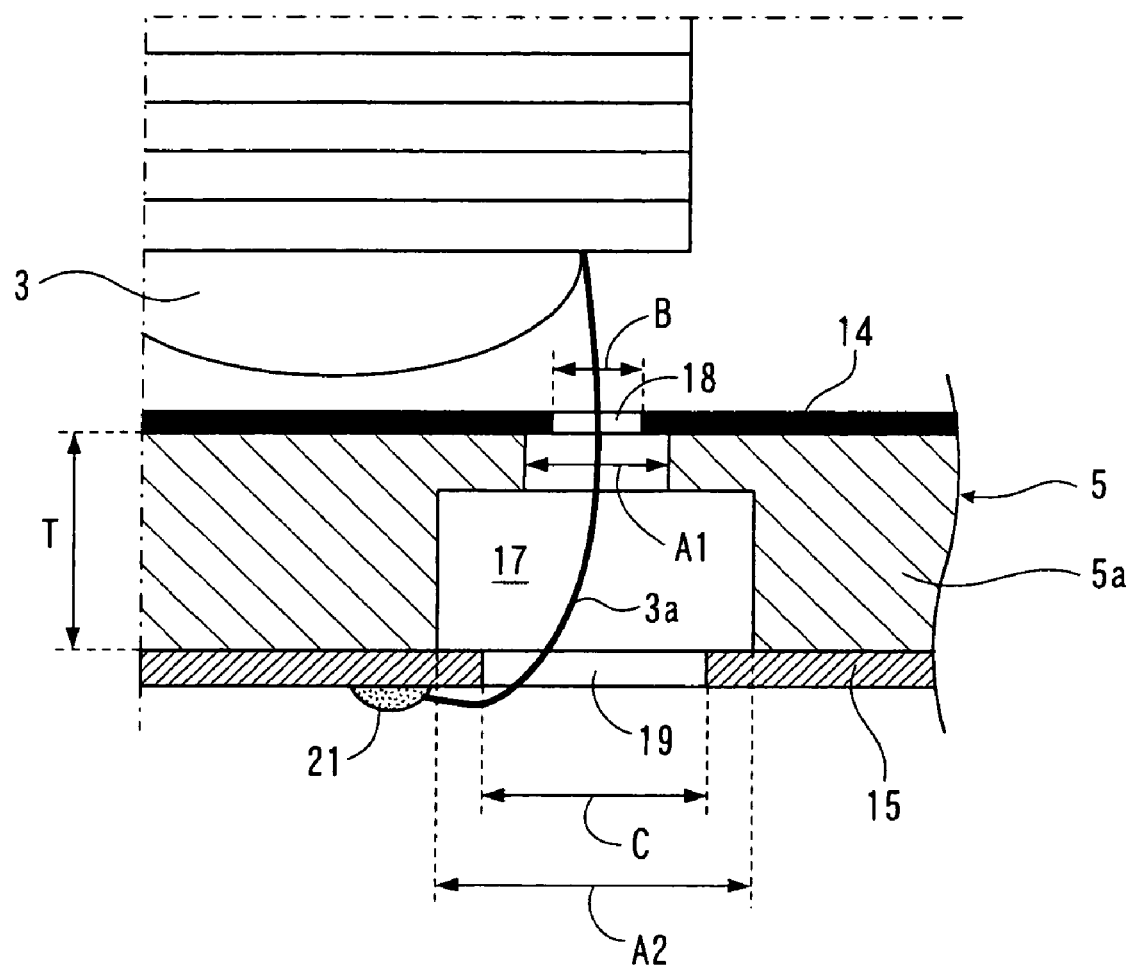
FIG. 4 is an enlarged view of a part of a hole formed in a base, an insulating sheet and a flexible printed circuit board of a spindle motor according to a third embodiment of the present invention.
Figure 5:
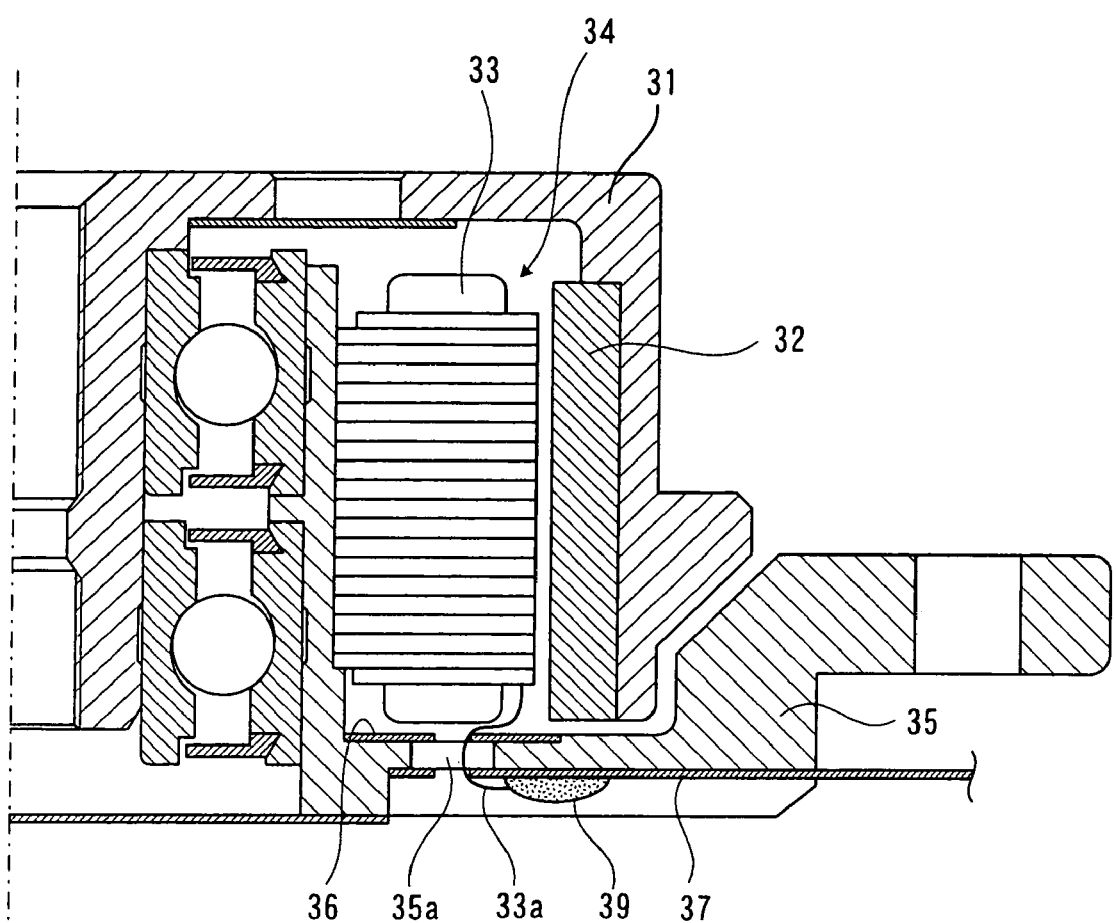
FIG. 5 is a sectional view of a conventional spindle motor.
Figure 6A:
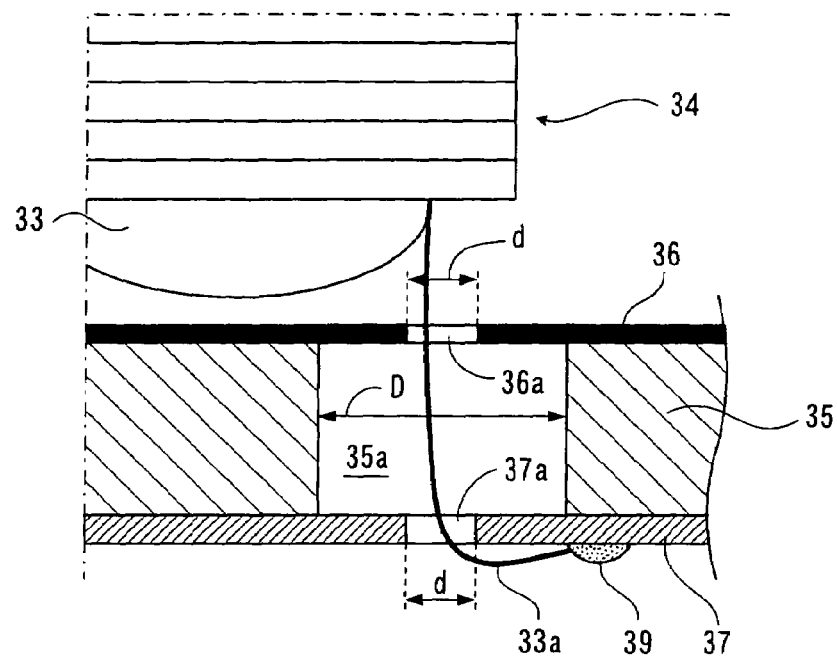
FIG. 6A is an enlarged view of a part of a hole formed in a base, an insulating sheet and a flexible printed circuit board of the conventional spindle motor, showing how an end portion of a coil winding is correctly drawn out.
Figure 6B:
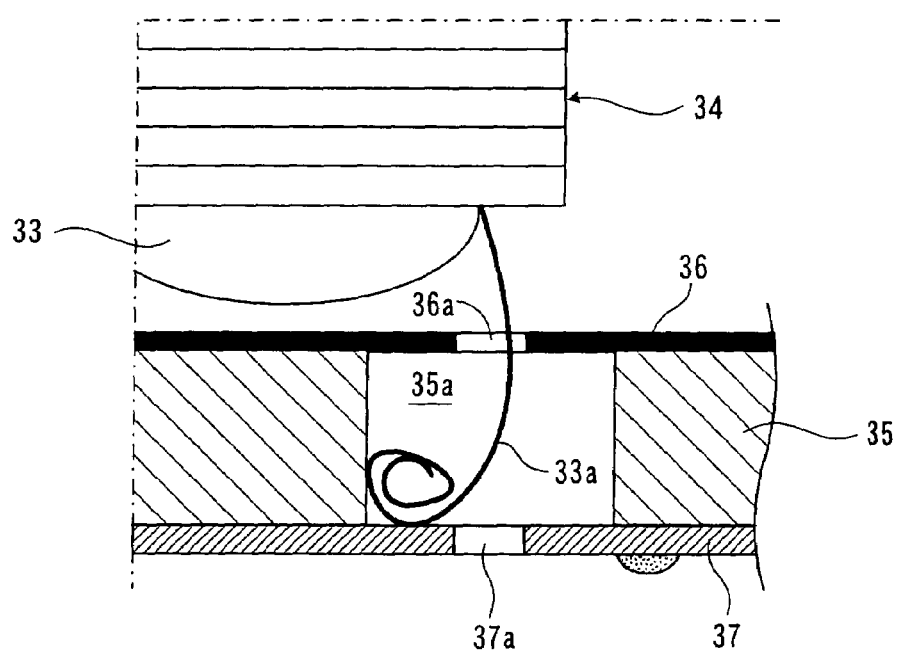
FIG. 6B is an enlarged view of a part in which an end portion of a coil winding of the conventional spindle motor becomes tangled in the interior of the hole.

In the second embodiment above, the hole 17 of the disk-shaped part 5a of the base 5 is formed in a conical shape with an inclining inner circumferential surface. However, as the third embodiment, the disk-shaped part 5a of the base 5 may be formed, as shown in FIG. 4, in such a multistaged shape that the diameter increases gradually from the insulating sheet 14 side to the flexible printed circuit board 15 side. Incidentally, although a level difference is formed on the inner circumferential surface of the multistaged hole 17 shown in FIG. 4, in the second embodiment shown in FIG.

3 no level difference exists in the hole 17, which is formed in a conical shape. Therefore, the conical hole 17 of the second embodiment can more positively maintain the insulation of the end portion 3a of the winding from the base 5 than the hole 17 of the third embodiment.

The present invention can be applied not only to a spindle motor for a hard disk drive, but also to motors for a video tape recorder and others.

What is claimed is:

1. A spindle motor, comprising:
   a body of rotation fixed with a drive magnet,
   a stator disposed opposite to the body of rotation and having a coil,
   a base fixed with the stator,
   an insulating sheet provided at least partly between the stator and the base, and
   a printed circuit board located in the base on an outer side of the motor,
   the base, insulating sheet and printed circuit board, respectively, having holes therein for communicating with each other,
   the coil having a winding end portion passing through the holes and to an outer side of the motor,
   wherein the hole in the printed circuit board and the hole in the insulating sheet have diameters, respectively, smaller than that of the hole in the base, and the diameter of the hole in the printed circuit board is larger than that of the hole in the insulating sheet, and
   the hole in the base is sealed by an adhesive.

2. The spindle motor according to claim 1, wherein the diameter of the hole in the base is not more than 5 mm.

3. The spindle motor according to claim 1, wherein a relation given by $A/T \geq 0.2$ holds, where the diameter of the hole in the base is denoted by A and the thickness of a part of the base formed with the hole is denoted by T.

4. The spindle motor according to claim 3, wherein the diameter of the hole in the base is not more than 5 mm.

5. A spindle motor, comprising:
   a body of rotation fixed with a drive magnet,
   a stator disposed opposite to the body of rotation and having a coil,
   a base fixed with the stator,
   an insulating sheet provided at least partly between the stator and the base, and
   a printed circuit board located in the base on an outer side of the motor,
   the base, insulating sheet and printed circuit board, respectively, having holes therein for communicating with each other,
   the coil having a winding end portion passing through the holes and to an outer side of the motor,
   wherein a relation given by $B<A1<C<A2$ holds, where the diameter of the hole formed in the base on the insulating sheet side is denoted by A1, the diameter of the hole formed in the base on the printed circuit board side is denoted by A2, the diameter of the hole formed in the insulating sheet is denoted by B, and the diameter of the hole formed in the printed circuit board is denoted by C, and
   the hole in the base is sealed by an adhesive.

6. The spindle motor according to claim 5, wherein a relation given by $A2/T \geq 0.2$ holds, where the thickness of a part of the base formed with the hole is denoted by T.

7. The spindle motor according to claim 6, wherein the diameter A1 of the hole in the base on the insulating sheet side is not more than 5 mm.

8. The spindle motor according to claim 7, wherein a relation given by $0.1 \text{ mm} \leq T \leq 5 \text{ mm}$ holds, where the thickness of a part of the base formed with the hole is denoted by T.

9. The spindle motor according to claim 6, wherein a relation given by $0.1 \text{ mm} \leq T \leq 5 \text{ mm}$ holds, where the thickness of a part of the base formed with the hole is denoted by T.

10. The spindle motor according to claim 5, wherein the diameter A1 of the hole in the base on the insulating sheet side is not more than 5 mm.

11. The spindle motor according to claim 10, wherein a relation given by $0.1 \text{ mm} \leq T \leq 5 \text{ mm}$ holds, where the thickness of a part of the base formed with the hole is denoted by T.

12. The spindle motor according to claim 5, wherein a relation given by $0.1 \text{ mm} \leq T \leq 5 \text{ mm}$ holds, where the thickness of a part of the base formed with the hole is denoted by T.

* * * * *